United States Patent [19]
Barlow et al.

[11] Patent Number: 4,643,125
[45] Date of Patent: Feb. 17, 1987

[54] BARRIERS

[75] Inventors: William A. Barlow, West Derby; Graham Merrington, Kingsley, both of United Kingdom

[73] Assignee: Vickers Public Limited Company, London, England

[21] Appl. No.: 796,900

[22] Filed: Nov. 12, 1985

[30] Foreign Application Priority Data

Nov. 13, 1984 [GB] United Kingdom ............... 8428593
Jan. 18, 1985 [GB] United Kingdom ............... 8501352

[51] Int. Cl.$^4$ ............................ B05C 3/12; B05D 1/20
[52] U.S. Cl. .................................... 118/402; 118/403; 118/426; 427/402; 427/434.3
[58] Field of Search ............... 118/402, 419, 403, 426; 427/402, 434.3

[56] References Cited
U.S. PATENT DOCUMENTS 4,224,896 9/1980 Barraud et al. ............... 118/402
4,511,604 4/1985 Barraud et al. ............... 118/402 X Primary Examiner—Michael R. Lusignan
Attorney, Agent, or Firm—Pollock, Vande Sande and Priddy

[57] ABSTRACT

A barrier for confining an area of monomolecular film on a Langmuir trough comprises a first barrier portion consisting of a transverse part and a longitudinal part and a second barrier portion connected at its ends to the ends of the first barrier portion and having two further longitudinal parts, one close to the first longitudinal part and the other further away. By altering the position of another transverse part joining the two further longitudinal parts the area enclosed is varied by changing the length of the longitudinal part close to the first longitudinal part and altering the length of the longitudinal part further away by an amount such that the sum of the two altered lengths remains constant.

7 Claims, 4 Drawing Figures

BARRIERS

FIELD OF THE INVENTION

This invention relates to Langmuir trough systems and in particular to barriers for defining variable surface areas of liquid support phases therein.

DESCRIPTION OF THE PRIOR ART

Langmuir trough systems include containers in which monomolecular layers of suitable substances (e.g. substances having amphiphathic molecules) can be produced on the surface of a liquid support phase. Such layers can then be transferred onto solid substrates, in which form they are often referred to as Langmuir-Blodgett films. The monomolecular layers are prepared by depositing a small quantity of a solution of the substance onto the liquid surface, and allowing the solvent to evaporate and leave molecules of the solute spread discontinuously over that surface. These molecules are then drawn together by reducing the available surface area using variable barriers, until the desired monolayer is obtained. (This can be detected by monitoring the surface pressure, a sharp rise in pressure indicating that the continuous monolayer has been achieved). Early variable barriers consisted of waxed threads floating on the liquid support phase, but these did not lend themselves readily to automated operation, and overlapping rigid rods also tended not to be totally satisfactory especially where they intersected.

To overcome such problems we devised a flexible barrier of constant length arranged in the configuration of two nested U-shaped portions in which the bases of the Us were straight and provided parallel transverse portions of the barrier. The arms of the Us lay longitudinally and were interconnected at their extended ends, thereby enclosing a generally rectangular area of surface with narrow parallel horns extending from adjacent corners of the rectangle. The flexible barrier was held taut around three pairs of relatively movable supports, with two pairs forming the corners of the two horns and the third at the tips of the horns. The barrier was free to move around the latter pair of supports so as to extend the arms of one U at the expense of those of the other, thereby enabling one base to move relative to the other and correspondingly to vary the enclosed area while maintaining a constant length perimeter.

These constant perimeter barriers successfully overcame the problems associated with the earlier troughs, were found to work well even in automated systems, and having since been successfully incorporated in automated commercial trough systems by Joyce-Loebl. However, we have now found that by altering the general configuration of the barrier we can reduce the number of moving parts and can reduce the unproductive area within the horns, while retaining the advantages of such constant length variable-area barriers.

SUMMARY OF THE INVENTION

Accordingly the present invention provides for a Langmuir trough an adjustable barrier of the kind having a constant perimeter length and enclosing an area which is variable by adjustment of the barrier, characterised in that the barrier has a configuration consisting essentially of a first portion of constant angular configuration comprising a transverse part connected to a longitudinal part, and a second portion of stepped configuration comprising a transverse part and two longitudinal parts connected one at each end of the transverse part and extending therefrom in opposite directions to meet the ends of the first portion, the longitudinal parts of the second portion each being of variable length but having a constant total length thereby to enable the transverse part interconnecting them to move longitudinally to the transverse part of the first portion and thereby vary the area between them separating the two transverse parts.

BRIEF DESCRIPTION OF THE DRAWINGS

The invention is illustrated by three specific embodiments illustrated in the accompanying drawings, in which.

DESCRIPTION OF PREFERRED EMBODIMENTS

Figure 1:
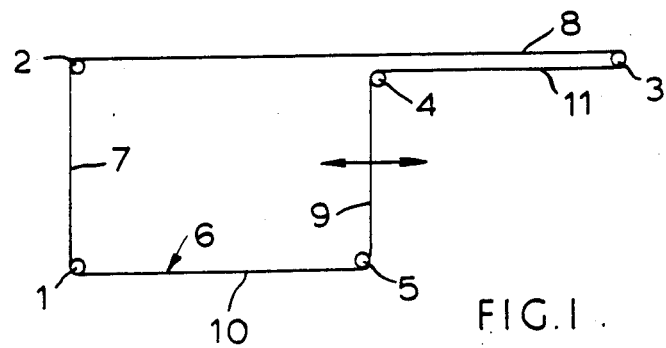
FIG. 1 is a plan view of one embodiment in which the barrier is a continuous flexible belt enclosing a working area of liquid surface within the trough (not shown)

In the embodiment shown in FIG. 1, the trough has five vertical supporting pegs, 1-5, formed from PTFE (though rollers could be used instead), and around these is mounted a continuous flexible belt 6, formed from a tape of PTFE coated glass fibres. The tape is suitably about 2 cm wide, though other widths could be used, the tape being held with its width vertical by the supporting pegs, thus presenting its edge to the viewer in the drawing. The pegs 1-3 at either end of the trough are in fixed positions, but the intermediate pegs 4, 5 are mounted on a carriage which is movable longitudinally. The continuous belt is thus held in a configuration consisting essentially of a first portion comprising a transverse part 7 extending between the two end pegs 1, 2 and connected to a longitudinal part 8 extending between pegs 2, 3 at opposite ends of the trough; and a second portion comprising a transverse part 9 stretched between the two intermediate pegs 4, 5 and two longitudinal parts 10, 11 connected one to each end of the transverse part 9 and extending therefrom in opposite directions to meet the ends of the first portion at the fixed pegs 1, 3.

The first portion 7, 8 is held by fixed pegs only, and hence has a constant angular configuration. However the second portion 9-11, with its ends in fixed positions is constrained in a stepped configuration around the intermediate pegs 4, 5 which are movable longitudinally (as shown by the arrows). As it moves to the right in the diagram, one longitudinal part 10 grows longer while the other 11 grows correspondingly shorter, their total length remaining the same. This is achieved by movement of the belt sliding around two or more of the pegs. In this embodiment, there are three ways in which this can be done. In one way (mode 1) there is no movement of the belt around the fixed pegs 1-3 and the transverse part 9 is moved longitudinally by sliding the belt around the intermediate pegs 4, 5. In the second way (mode 2) there is no movement around the intermediate pegs 4, 5 but the belt is slipped anticlockwise around the fixed pegs 1-3. The third way (mode 3) includes all possible mixtures of the other two, e.g. with the belt sliding around all the pegs in the appropriate direction (anticlockwise around all pegs except for one intermediate peg 5).

It should be noted however, that in this embodiment the belt is uniform all round the enclosed area, and the notion of different portions is used herein to describe the configuration of the belt rather than the belt itself. In mode 2 there is an exchange of lengths of belt between the two defined portions of the configuration, with some of the belt in the first portion moving into the second portion as it slides around the fixed peg 1, and an equal length of belt in the second portion slides around the opposite fixed peg 3 to enter the first portion of the configuration. All the above directions are reversed when the transverse part 9 moves to the left.

Figure 2:
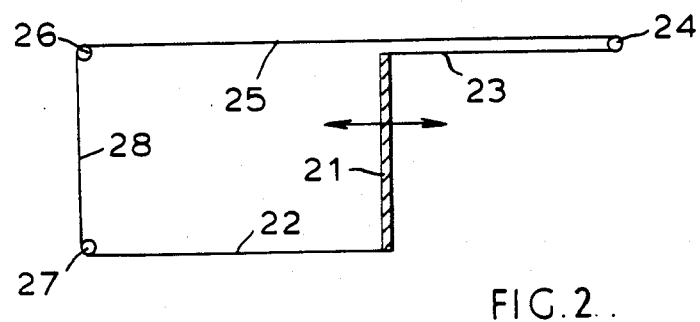
FIG. 2 is a similar plan view of a second embodiment having a rigid transverse member.

However, not all embodiments can move in all three modes. In the second embodiment shown in FIG. 2, the overall configuration is the same, but the transverse part 21 of the second portion is rigid. There can therefore be no movement of the belt between the transverse part 21 and the longitudinal parts 22, 23 attached at either end. These longitudinal parts are formed of a flexible belt like that used in FIG. 1, the belt extending around a PTFE fixed peg 24, continuing to form the longitudinal part 25 of the first portion of the configuration, rounding further fixed pegs 26, 27 at the other end, and further continuing as the longitudinal part 22 of the second portion of this configuration until it reaches the rigid transverse bar 21 again.

In use the bar can be made to move longitudinally in either direction, but only in the manner described as mode 1 above. Thus to move to the right in the drawing, some of the belt forming the longitudinal part 23 of the second portion slides around the peg 24 into the longitudinal part 25 of the first portion. Likewise some of the belt forming that longitudinal part moves into the transverse part 28 of the first portion, this movement continuing as further belt moves around the other fixed peg 27 into the second portion 22. As before, movement of the bar to the left requires movement of the belt around the pegs and from one portion to the other in the opposite direction.

Figure 3:
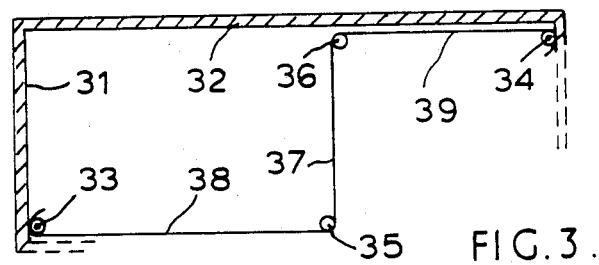
FIG. 3 is a similar plan view of a third embodiment in which the wall of the trough forms part of the barrier.

FIG. 3 shows the third embodiment in which the first portion is rigid, being formed by two walls 31, 32 of the container itself. The second portion is formed of a flexible belt like that of FIG. 1 except that the two ends of the belt are secured to the container walls by two clamps 33, 34 instead of continuing as a flexible loop around the periphery of the enclosed area. However, the periphery is still of constant length including a rigid portion and a flexible portion. The flexible portion 37, 38, 39 is held in its stepped configuration by two pegs 35, 36 supported on a longitudinally movable trolly (not shown), again as used in FIG. 1. However, there can be no movement of the belt into or out from the first portion, so movement of the flexible transverse part 37 of the second portion can only be by the mode 2 movement described above.

Figure 4:
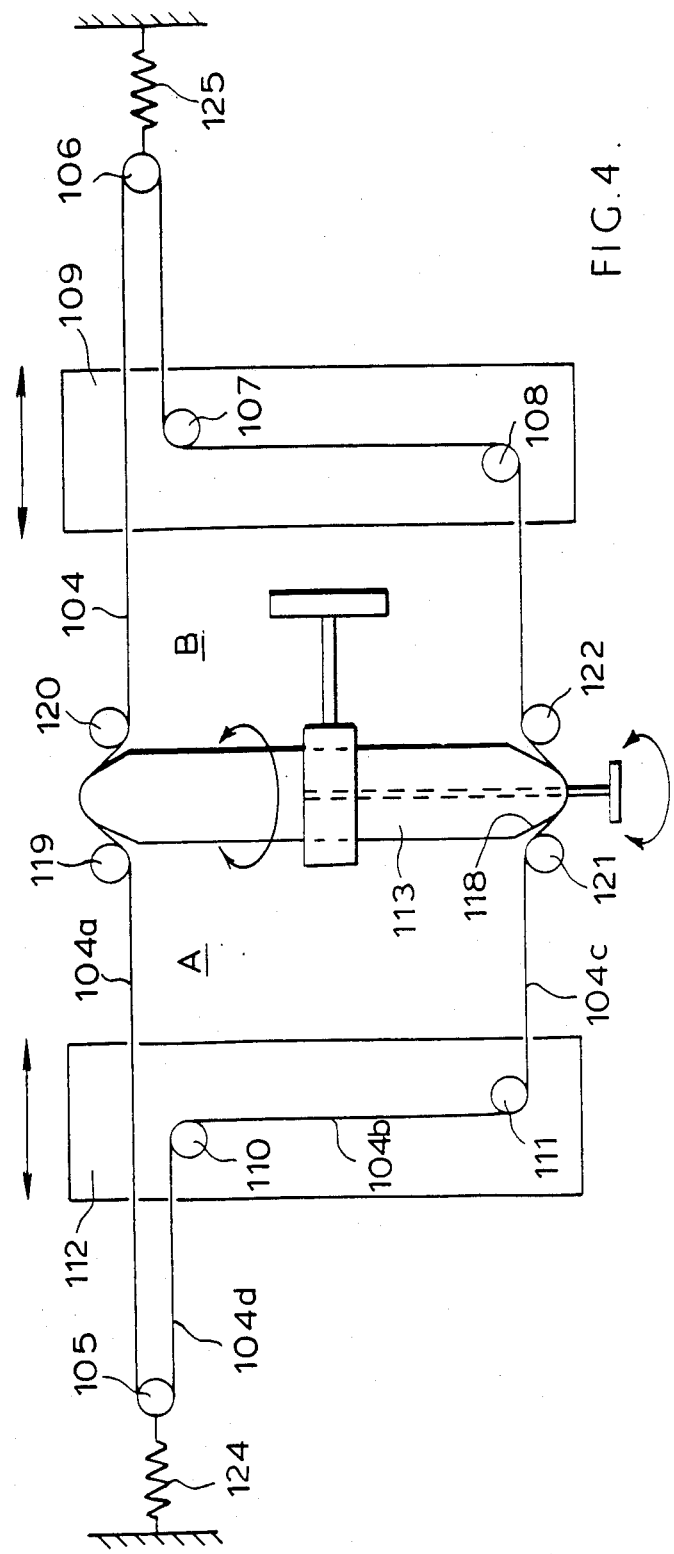
FIG. 4 is a similar plan view of a fourth embodiment in which one wall of the trough serves as a barrier between two similar troughs.

FIG. 4 shows an arrangement in which the barrier of FIG. 1 is duplicated to confine two separate areas A, B having a common rigid static transverse part 113 and each individual barrier is arranged to operate according to the aforesaid mode 1. A single belt 104 extends under tension around pegs 105, 106 which are stationary when the system is in use, pegs 107, 108 on a bridge 109 and pegs 110, 111 on a bridge 112. The bridges 109, 112 are each mounted to slide towards and away from the fixed transverse part 113. Arcuate surfaces 118 are formed at the ends of the rigid transverse part 113 and pegs 119, 120, 121, 122 are mounted so as to keep the belt 104 tightly held against slipping over the arcuate surfaces. Springs 124, 125 act on the pegs 105, 106 to keep the belt 104 under tension. It will be seen that each barrier consists essentially of a first portion of constant angular configuration comprising a transverse part 113 connected to a longitudinal part 104a and a second portion of stepped configuration comprising a transverse part 104b connected at its ends respectively to longitudinal parts 104c, 104d.

These embodiments have been described above, but there are other variations which can be used while keeping to the configuration of the present invention. For example, the belt of FIG. 1 may be held in place by clamps 33, 34 to replace pegs 1, 3, with a further clamp in the apex of the first portion to replace the other fixed peg 2. Such a hybrid device will operate in mode 2 only, but by using a continuous belt any risk of material escaping round the clamp or slip of the end of the belt around the clamp, as might have arisen in the third embodiment, would be avoided.

We find that the configuration of the present invention can provide a number of advantages over the previous configuration, especially where small trough systems are required. There can be fewer moving parts as only the transverse part of the second portion need move, whereas two of the three pairs of pegs had to move previously. This leads to a simpler driving mechanism and smaller system. One of the horns has been avoided, thereby reducing wasted area, and this system can more readily be used for small scale work, e.g. when only very small samples are available.

We claim:

1. A barrier assembly for use on a Langmuir trough to confine an area of monomolecular film on a subphase, the barrier assembly comprising a first barrier portion of constant angular configuration consisting of a transverse part extended by a longitudinal part and a second barrier portion of stepped configuration fixed to said first barrier portion to form a closed loop therewith, said second barrier portion consisting of a second transverse part, a second longitudinal part of variable length extending from one end of said second transverse part and a third longitudinal part of variable length extending from the other end of said second transverse part, said second and third longitudinal parts extending in opposite directions from said second transverse part to join the ends of said first barrier portion, and means for varying the lengths of said second and third longitudinal parts while keeping their total length constant and thereby varying the separation between said first and second transverse portions and consequently the area confined by said barrier portions.

2. A barrier assembly according to claim 1, including five vertical pegs, said two barrier portions being constituted by an endless belt positioned by said pegs, three of said pegs being located to shape said first barrier portion and the remaining two pegs being located to shape said second barrier portion at the junctions between said second transverse part and said second and third longitudinal parts, at least two of said pegs being movably mounted for varying the lengths of said second and third longitudinal parts while keeping their total length constant and while said endless belt moves over said movable pegs.

3. A barrier assembly according to claim 2, in which said remaining two pegs are mounted for simultaneous movement at a fixed distance from one another towards and away from said first transverse part for varying the lengths of said second and third longitudinal parts while keeping their total length constant, and while said three of said pegs remain fixed.

4. A barrier assembly according to claim 2, in which said three of said pegs are mounted for simultaneous movement longtudinally at fixed distances from one another for varying the lengths of said second and third longitudinal parts while keeping their total length constant and while said remaining two pegs remain fixed.

5. A barrier assembly according to claim 1, in which said second transverse part is rigid and said first transverse part together with said first, second and third longitudinal parts are constituted by a flexible belt fixed at its ends respectively to the ends of said second transverse part, the assembly further comprising three pegs positioned to shape said first barrier portion, said second transverse part being mounted to move towards and away from said first transverse part for varying the lengths of said second and third longitudinal parts while keeping their total lengths constant and while said flexible belt moves over said three pegs.

6. A barrier assembly according to claim 1, in which said first barrier portion is a rigid unit and said second barrier portion is a flexible belt, fixed at its ends to the ends of said first portion, the assembly further comprising two pegs located to shape said second barrier portion at the junctions between said second transverse part and said second and third longitudinal parts, said two pegs being movably mounted for varying the lengths of said second and third longitudinal parts while keeping their total length constant.

7. A barrier assembly according to claim 1, in which said first transverse part is rigid and said second transverse part together with said first, second and third longitudinal parts are constituted by a single flexible belt fixed at its ends respectively to the ends of said first transverse part, the assembly further comprising one peg located for said belt to pass therearound at the junction between said first longitudinal part and said third longitudinal part and two further pegs located to shape said second barrier portion at the junctions between said second transverse part and said second and third longitudinal parts, said two pegs being mounted for simultaneous movement at a fixed distance from one another towards and away from said first transverse part for varying the lengths of said second and third longitudinal parts while keeping their total length constant and while said endless belt moves over said two pegs.

* * * * *